(12) United States Patent
Fuhs et al.

(10) Patent No.: US 7,552,374 B2
(45) Date of Patent: *Jun. 23, 2009

(54) APPARATUS AND METHOD FOR TRACKING PACKETS IN A RELIABLY CONNECTED TRANSMISSION SYSTEM

(75) Inventors: Ronald Edward Fuhs, Rochester, MN (US); Steven Lyn Rogers, Rochester, MN (US); Nathaniel Paul Sellin, Rochester, MN (US); Scott Michael Willenborg, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 25 days.

This patent is subject to a terminal disclaimer.

(21) Appl. No.: 11/949,026

(22) Filed: Dec. 1, 2007

(65) Prior Publication Data
US 2008/0072114 A1 Mar. 20, 2008

Related U.S. Application Data

(63) Continuation of application No. 10/948,778, filed on Sep. 23, 2004, now Pat. No. 7,360,140.

(51) Int. Cl.
*G08C 25/02* (2006.01)
*H04L 1/18* (2006.01)
(52) U.S. Cl. .................................................. 714/748
(58) Field of Classification Search ................ 714/748, 714/749, 18
See application file for complete search history.

(56) References Cited

U.S. PATENT DOCUMENTS 5,553,083 A * 9/1996 Miller ........................ 714/748
5,951,706 A 9/1999 Benner

OTHER PUBLICATIONS

Walters et al., Broadcast file distribution protocols for satellite networks, 1989, IEEE, p. 133-138.*
Blackmore, Multicast file transfer in a military satellite broadcast system, 2000, IEEE, p. 1094-1098.*

* cited by examiner

*Primary Examiner*—Shelly A Chase
(74) *Attorney, Agent, or Firm*—Martin & Associates LLC; Derek P. Martin

(57) ABSTRACT

A method and apparatus tracks packets and reliably transmits data over a computer transmission system with a reduced amount of memory needed in the transmission interface. The invention eliminates the need to keep all the packets of data queued until the acknowledge message for that data has arrived. Instead, it keeps track of how many packets have been sent and which packets correspond to the end of a message, marking them off when acknowledge messages are received. If packets are lost, the invention determines which packet were lost, backs up to the lost packet, re-fetches the data and resends it. Embodiments of the present invention eliminate the need to queue packets, reducing silicon size and allowing the available bandwidth of the output bus to be more fully utilized.

16 Claims, 8 Drawing Sheets

APPARATUS AND METHOD FOR TRACKING PACKETS IN A RELIABLY CONNECTED TRANSMISSION SYSTEM

CROSS-REFERENCE TO RELATED APPLICATION

This patent application is a continuation of a patent application with the same title, U.S. Ser. No. 10/948,778 filed on Sep. 23, 2004, which is incorporated herein by reference.

BACKGROUND OF THE INVENTION

1. Technical Field

This invention generally relates to data processing, and more specifically relates to the sending of digital information between computers such as computers on a network.

2. Background Art

Computer networks have been developed that allow computer systems to communicate with each other. In many computer networks, computers need to transfer large amounts of data over a transmission line. The computer often sends this data using a software program that creates a stack of work to do in memory. The software program then informs the transmission hardware there is data in the stack to be sent via a kickoff indicator set for the hardware. The hardware will then fetch information off this stack and handle sending the data to another computer processor or system across a transmission cable.

When information is passed along a cable, the transmission time can be long and often subject to errors introduced by noise. In many computer systems such as those described above, data is sent in packets and checked to ensure no packets have been dropped due to the noise of the cable. The computer at the receiving end informs the sending computer it has received completed data packets. Hence, for reliably connected systems, acknowledges need to be sent from the receiving system to the sending system and a mechanism in the sending system for handling acknowledges and resending dropped packets is required.

A common method for implementing a packet data transmission system is to have the sending side create, queue and send packets, and then wait for an acknowledge message to be returned before deleting the packets corresponding to the acknowledge message from the queue. If packets are lost due to errors, the sending side will time out, indicated by no acknowledge packet having been received in a defined period of time, and the sender will then resend the packets. Since any lost packets are still in the queue, this is a simple matter of resetting the 'next packet to send' pointer back to the packet which timed out and resending the packets from that point in the queue.

In the prior art method, the sending queue needed to internally queue all the pending packets waiting for acknowledgment, including all the packets that are in flight on the transmission media. Increasing the length of the transmission media and hence the delay increases the number of data packets in flight. Also, increasing the transmission frequency increases the number of packets in flight.

In addition, to reduce the amount of bandwidth used to acknowledge packets received, acknowledge messages are often coalesced. In a coalesced system, rather than specifically acknowledging each individual packet, one acknowledge message may acknowledge multiple sent packets. Coalescing increases the difficulty of determining which packet is lost as there is not a one-one correspondence with packets sent to acknowledges received, and increases the number of packets that are held in the sending queue waiting for acknowledgment.

The disadvantage of the prior art approach is that the number of packets that can be in flight is limited by the depth of the queue in the sending interface chip. For small packet sizes and short transmission times the queue size is manageable, but it can be seen that the size can grow substantially for larger packet sizes, increased transmission lengths and higher transmission speeds. Infiniband is an emerging high speed network interconnect technology. In an Infiniband system a 4k packet is used. The prior art approach would require an increasing number of 4k packets to achieve longer transmission lengths. For this reason, the required queue size becomes very costly. Thus traditional techniques for queuing packets are not economically feasible for high speed, long transmission line systems that need high reliability and efficient resending of dropped packets.

DISCLOSURE OF INVENTION

According to the preferred embodiments, a method and apparatus is described for tracking packets and reliably transmitting data over a computer transmission system with a reduction in the amount of memory needed in the transmission interface. An advantage of the present invention is that it eliminates the need to keep packets queued until the acknowledge has arrived. Instead, it keeps track of how many packets have been sent and which packets correspond to the end of a message, marking them off when acknowledges are received. If packets are lost, the interface determines which packet was lost, backs up to the lost packet, re-fetches the data and re-sends it. Thus, embodiments of the present invention eliminate the need to queue packets, thereby greatly reducing silicon size, and allow the available bandwidth of the output bus to be more efficiently utilized by not unnecessarily suspending the sending of packets when the queue fills up, as would be required using the prior art method described above.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

The present invention involves sending messages over a communication interface between computers that are connected such as on a network. A brief overview below provides background information that may help the reader to understand the environment of the present invention.

1. Overview

Networked Computer Systems

Connecting computers together on a network requires some form of networking software. Over the years, the power and sophistication of networking software has greatly increased. Networking software typically defines a protocol for exchanging information between computers on a network. Many different network protocols are known in the art. Examples of commercially-available networking software is Novell Netware and Windows NT, which each implement different protocols for exchanging information between computers.

One significant computer network that has recently become very popular is the Internet. The Internet grew out of a proliferation of computers and networks, and has evolved into a sophisticated worldwide network of computer systems. Using the Internet, a user may access computers all over the world from a single workstation. TCP/IP (Transmission Control Protocol/Internet Protocol) is an example of a network protocol that is in wide use today for communicating between computers on the Internet. In addition, the use of TCP/IP is also rapidly expanding to more local area networks (LANs) and Intranets within companies.

2. Detailed Description

According to preferred embodiments of the present invention, an apparatus and method is provided for tracking packets and reliably transmitting data over a computer transmission system with a reduction in the amount of memory needed in the network interface. The I/O processor in the network interface keeps track of how many packets have been sent and which packets correspond to the end of a message, marking them off when acknowledge messages are received. If packets are lost, the interface determines which packet was lost, backs up to the lost packet, re-fetches the data and re-sends it. Thus, the preferred embodiments eliminate the need to queue packets, thereby reducing silicon size in the network interface and allowing the available bandwidth of the output bus to be more efficiently utilized.

Figure 1:
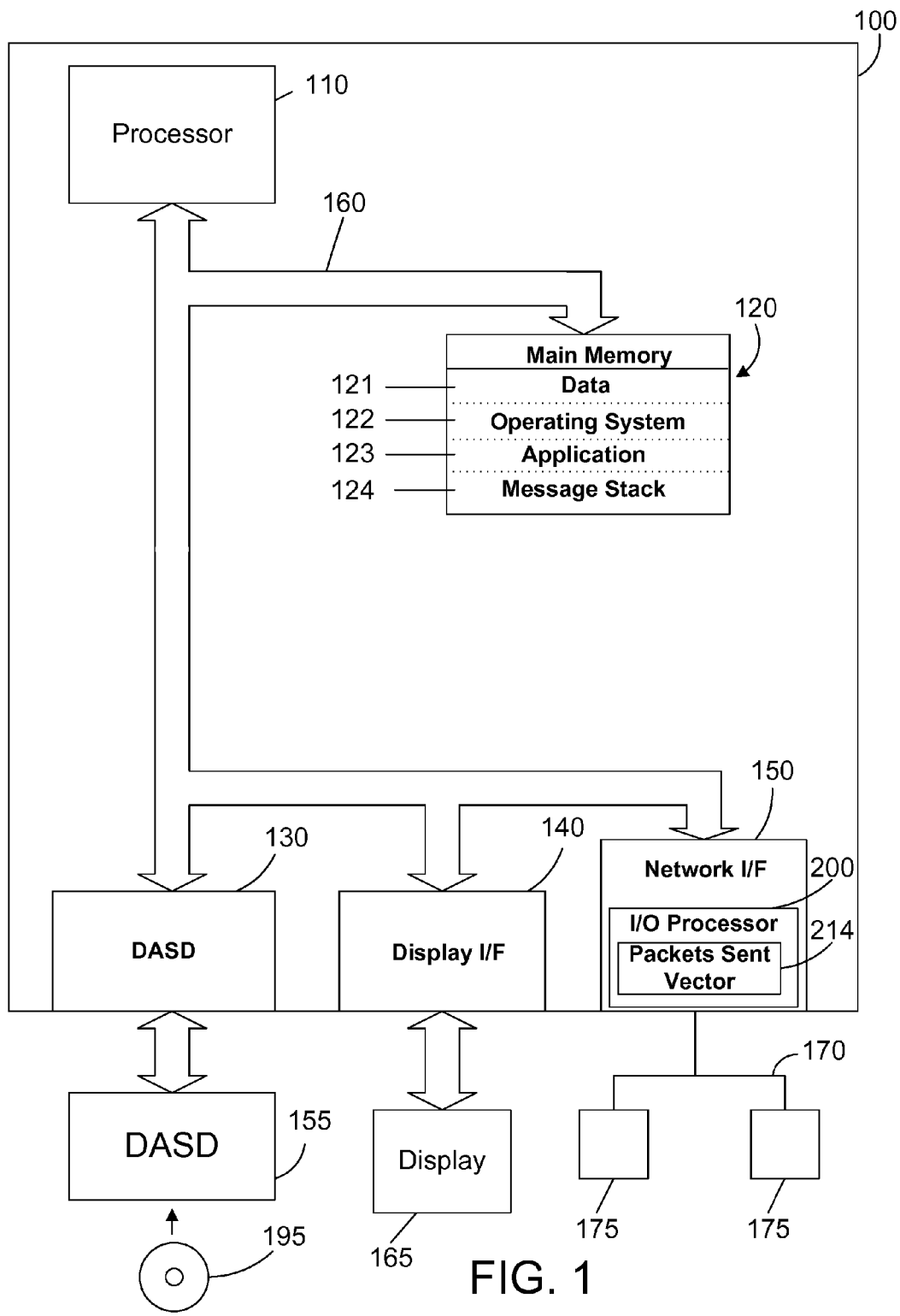
FIG. 1 is a block diagram of an apparatus in accordance with preferred embodiments.

Referring now to FIG. 1, a computer system 100 is an enhanced eServer iSeries computer system, and represents one suitable type of computer that can be networked together in accordance with the preferred embodiments. Those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD RW drive, which may store data to and read data from a CD RW 195.

Main memory 120 in accordance with the preferred embodiments contains data 121, an operating system 122, an application program 123, and a message stack 124. Data 121 represents any data that serves as input to or output from any program in computer system 100. Operating system 122 is a multitasking operating system known in the industry as OS/400; however, those skilled in the art will appreciate that the spirit and scope of the present invention is not limited to any one operating system. Application program 123 represents any suitable software application that may need to send data to another computer system (e.g., 175) via network interface 150. Message stack 124 is a stack of work items or messages to transfer from the computer system 100 to another system 175. When application program 123 needs to transmit data via the network interface 150 to another computer system 175, the application program 123 writes one or more messages onto the message stack 124. Messages written to the message stack 124 are then transmitted via the network interface 150.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, the application program 123, and the message stack 124 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol. The network interface 150 of the preferred embodiments includes an I/O processor 200 having a Packets Sent Vector 214 as described further below.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable signal bearing media used to actually carry out the distribution. Examples of suitable computer-readable signal bearing media include: recordable type media such as floppy disks and CD RW (e.g., 195 of FIG. 1), and transmission type media such as digital and analog communications links.

Figure 2:
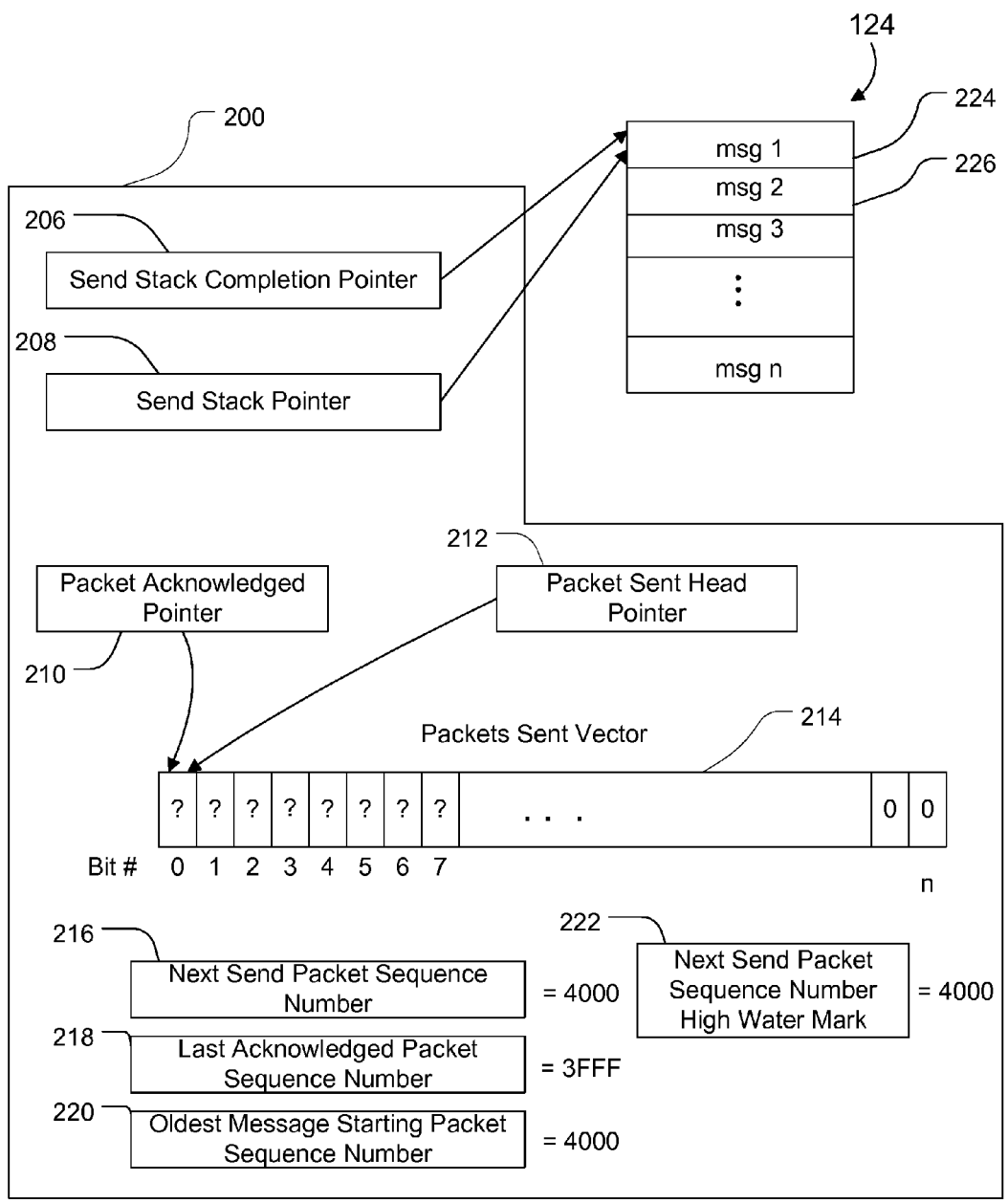
FIG. 2 is a block diagram of the I/O processor shown in FIG. 1 just before beginning the transmission of data.

Referring now to FIG. 2, the I/O processor 200 from FIG. 1 is shown in further detail. The I/O processor 200 is a portion of the network interface 150 of a computer system 100 such as described above with reference to FIG. 1. The I/O processor 200 is a computer processor or state machine that controls the hardware and flow of data in the network interface 150. Further, FIG. 2 also shows the message stack 124 that resides in main memory 120 in FIG. 1. Further details of how the I/O processor 200 operates and uses the data in memory is described in the following paragraphs according to preferred embodiments of the present invention.

Again referring to FIG. 2, the message stack 124 in memory 120 (FIG. 1) is shown. Software application 123 running on the computer 100 (in FIG. 1) writes messages to the message stack 124, which represents a number of work items or messages to transfer from the computer system 100 to another system 175 (see FIG. 1). Each work item or message may be comprised of many packets (for instance, a 16 KB message would be 4 packets if the packet size is 4 KB).

The I/O processor 200 contains a number of pointers and a Packets Sent Vector 214. These are part of the network interface and are typically implemented as actual hardware registers. Of course they could also be implemented in firmware or software and would then actually be data in memory. Each of the pointers are defined below:

Send Stack Completion Pointer (SSCP) 206—points to the next message in the message stack 124 for which an acknowledge is expected. It advances when all packets in the message have been acknowledged, indicating that the stack entry was successfully transmitted;

Send Stack Pointer (SSP) 208—points to the next message in the stack that needs to be sent;

Packet Acknowledge Pointer (PAP) 210—points to a bit in the Packet Sent Vector 214 that indicates the last packet acknowledged; this advances as acknowledges are received;

Packet Sent Head Pointer (PSHP) 212—points to which bit in the Packets Sent Vector 214 will be modified when the next packet is sent;

Packets Sent Vector (PSV) 214—contains an indicator to show whether the corresponding packet lies on a message boundary (message boundary means the packet is the beginning or end of a message in the message stack). In a preferred embodiment the PSV 214 contains one bit for each packet sent of a message, and is set to a bit value of one if the corresponding packet is the last packet in a message;

Next Send Packet Sequence Number (NSPSN) 216—keeps track of the sequence number of the first packet of the message pointed to by SSCP 206 and is used when a timeout is detected and hardware needs to restart a sequence;

Last Acknowledged Packet Sequence Number (LAPSN) 218—the packet sequence number (PSN) of the last acknowledge packet that was received;

Oldest Message Starting Packet Sequence Number (OMSPSN) 220—keeps track of the starting packet sequence number of the next message in the stack to be acknowledged and is used when a time out is detected and hardware needs to restart a sequence;

Next Send Packet Sequence Number High Water Mark (NSPSNHWM) 222—stores the highest PSN sent by hardware and is used when a time out is detected to determine when new packets are again being sent.

When the I/O processor 200 is informed that there are messages in the message stack 124 to process, the I/O processor 200 will read the first message 224 on the message stack 124 pointed to by the Send Stack Pointer 208 and begin sending it to the receiving computer 175. As each packet of the message is sent, the Packets Sent Head Pointer 212 is advanced by one. When the last packet of the message is sent, the bit in the Packets Sent Vector 214 pointed to by the PSHP 212 is set to a one, indicating this packet is the last packet of the message. If the packet was not the last packet of a message, the bit would be set to zero after the packet was sent. The PSHP 212 is then advanced to the next bit in the Packets Sent Vector 214. Since the sending of all packets of the message is complete at this point, the I/O processor 200 will also advance the Send Stack Pointer 208.

The I/O processor 200 continues to send packets until the message stack 124 is empty, or the PSV 214 is full. The PSV is a circular queue, so as bits are acknowledged the pointers on the PSV can wrap around and continue using the PSV. The PSV is full when all the bits are pointed to or are between the PSHP 212 and the PAP 210. Given that the PSV 124 is simply a bit per packet, it's length can be optimally determined. Specifically, if the transmission time of the packet plus the time to receive an acknowledge require, for instance, 50 packets in flight, the PSV could be designed to have 64 bits to ensure hardware is not restricted in its ability to send packets.

When an acknowledge message is received, the I/O processor 200 uses the information in the acknowledge message to determine which packets have been acknowledged by the receiving computer 175 and marks the progress of acknowledging the sent messages. To do this, the packet sequence number in the acknowledge message is compared to the LAPSN 218, and the PAP 210 is incremented by the difference. For instance, if the acknowledge message has a sequence number of 5 and the LAPSN is 2, the I/O processor 200 knows that 3 packets, corresponding to sequence numbers 3, 4, and 5, were acknowledged by the receiving end and the Packet Acknowledge Pointer 210 can be incremented by this amount.

As the I/O processor 200 is advancing the PAP 210, its checks the value of each bit of the Packets Sent Vector 214 that PAP 210 has advanced past. Each PSV bit being a one indicates the last packet of a message was received, completing a message (recall the PSV was set to a one when the last packet of the message was sent). When the PAP encounters a bit value of one, the I/O processor knows that a message has reliably been transferred, all acknowledges for the message have been received and the Send Stack Completed Pointer 206 can be advanced as there is now no longer a reason to retransmit this message; it has reliably been transferred. The interface will also update the sequence number held in the OMSPSN 220.

If a packet is lost such that the receiving computer does not send back an acknowledge, or the acknowledge itself is lost, the I/O processor 200 will detect a time out condition and it is a simple matter to resend the lost packets. Upon a time out detection, the I/O processor 200 will take the item pointed to by the Send Stack Completion Pointer 206 and use it as the next item to send; since this pointer is only advanced when messages are completed, it points to the first message in the message stack that has not been acknowledged by the receiving end and therefore is the first message that needs to be resent. Since the retried packet needs to have the same packet sequence number of the original packet, it is necessary for hardware to determine the starting PSN of the message. This is a trivial matter as all hardware needs to do is reload the NSPSN 216 from the OMSPSN 220. At this point, the I/O processor can resend the original message, with the original packet sequence number, recreating exactly the original sequence.

Figure 3:
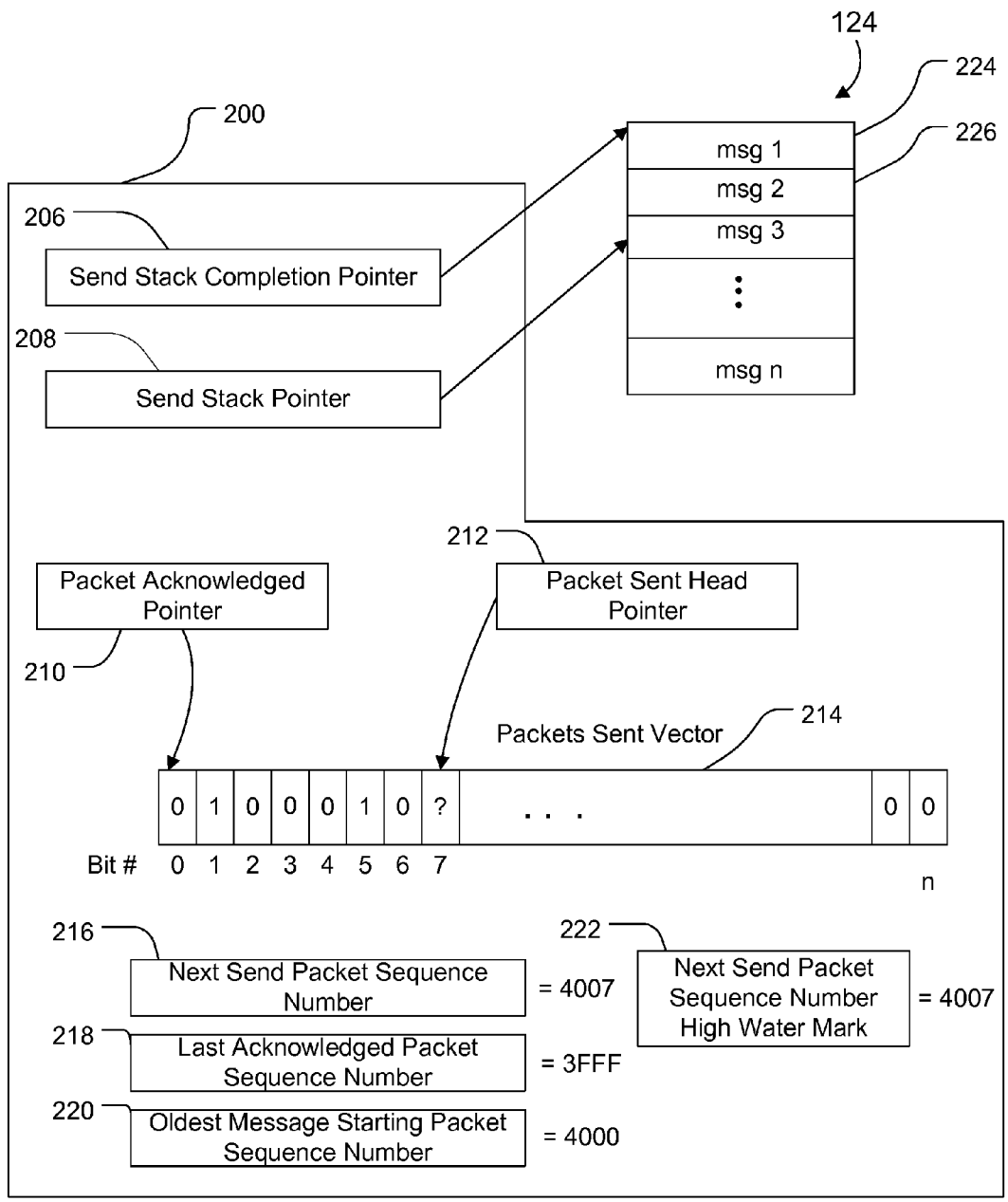
FIG. 3 is a block diagram of the I/O processor shown in FIG. 1 after sending 7 packets of data.

Referring to FIG. 2 through FIG. 5, a specific example of the sequence of events described above is illustrated. FIG. 2 shows the starting state of the I/O processor 200 just after the application 123 has written to the message stack 124 and given the command to the I/O processor 200 to begin sending data. At this point, both the Packet Acknowledge Pointer 210 and the Packets Sent Head Pointer 212 are pointing to the same bit in the Packets Sent Vector 214, indicating no packets are outstanding—and no packets are waiting for acknowledgment. Also, the Send Stack Pointer 208 and Send Stack Completion Pointer 206 are pointing to the same message 224 in the message stack 124. FIG. 3 shows the state of the I/O processor 200 after 7 packets have been sent. Each time a packet was sent the Packets Sent Head Pointer 212 was advanced one bit location, therefore the pointer now points to bit 7 in the Packets Sent Vector 214. As packets were sent, the bits in the Packets Sent Vector 214 were set to a one if the packet being sent was a final packet of a message, otherwise it was set to zero. Thus from the bits set in the Packets Sent Vector 214, it can be seen that packet 1 and packet 5 were the last packets of a message. The Packets Sent Vector 214 provides an indication of the message boundaries. The Package Acknowledged Pointer 210 indicates no packets have been acknowledged yet. The NSPSN 216 and the NSPSNHWM 222 were also incremented and now both hold 4007.

Figure 4:
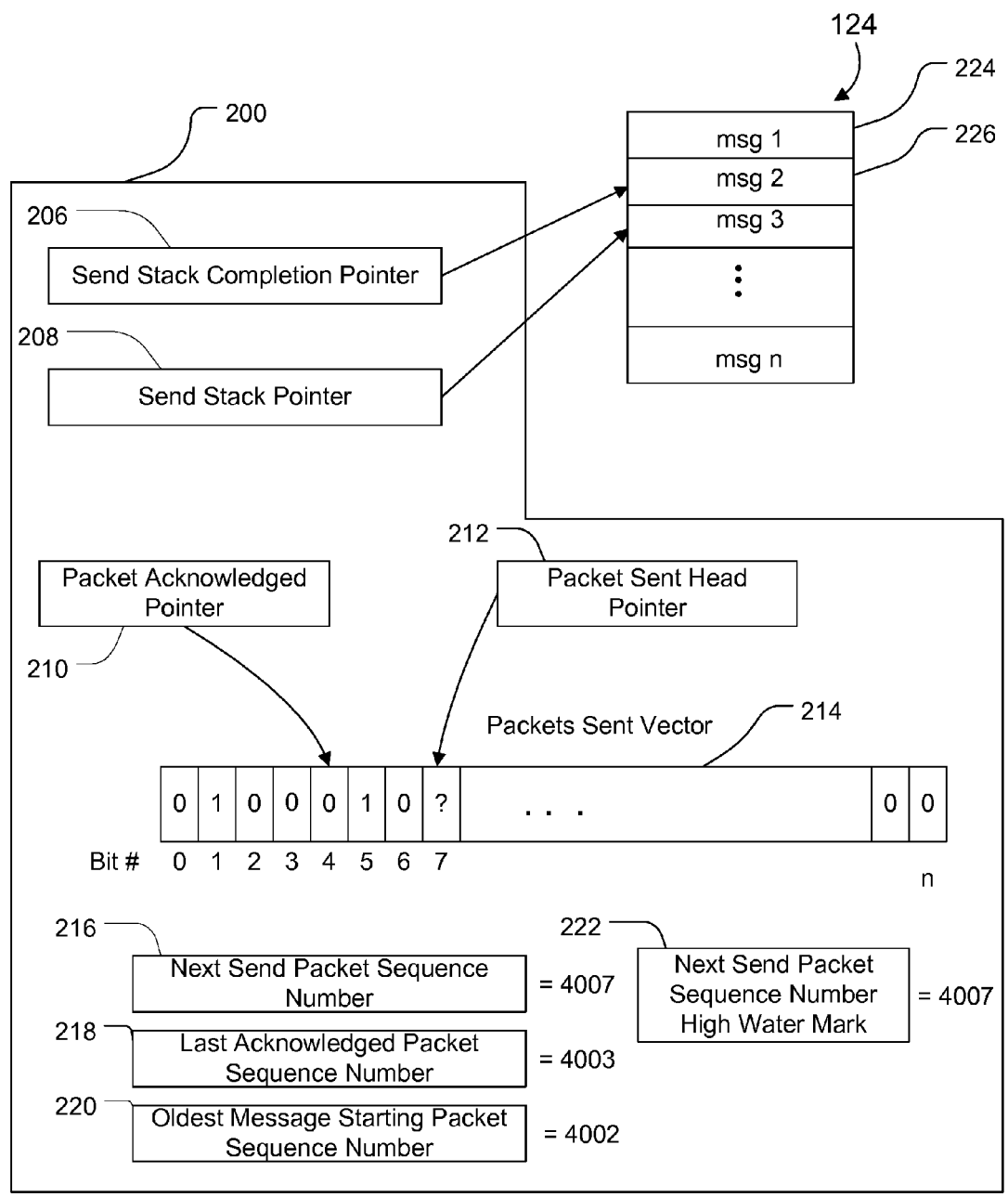
FIG. 4 is a block diagram of the I/O processor shown in FIG. 1 after receiving an acknowledge message.

FIG. 4 shows the state of the I/O processor 200 after receiving and processing an acknowledge message for PSN=4003. To process this acknowledge message, the I/O processor 200 advances the Packet Ack Pointer 210 one bit at a time while incrementing the Last Acknowledged Packet Sequencer Number 218 once for each move of the pointer. This process is complete when the Last Acknowledged Packet Sequence Number 218 equals the PSN of the received acknowledge message. This allows the system to accommodate coalesced acknowledge packets. At the same time while the Packet Acknowledge Pointer 210 is being updated, the I/O processor 200 checks the status of each bit of the Packets Sent Vector 214. If a one bit is detected the I/O processor will:

1. update the Oldest Message Starting Packet Sequence Number with the current value of Last Acknowledged Packet Sequence Number plus 1 (4000+2=4002 in the present example).

2. indicate the first message is complete by advancing the Send Stack Completion Pointer 206 to the next message 226 (msg 2) in the message stack 124.

Figure 5:
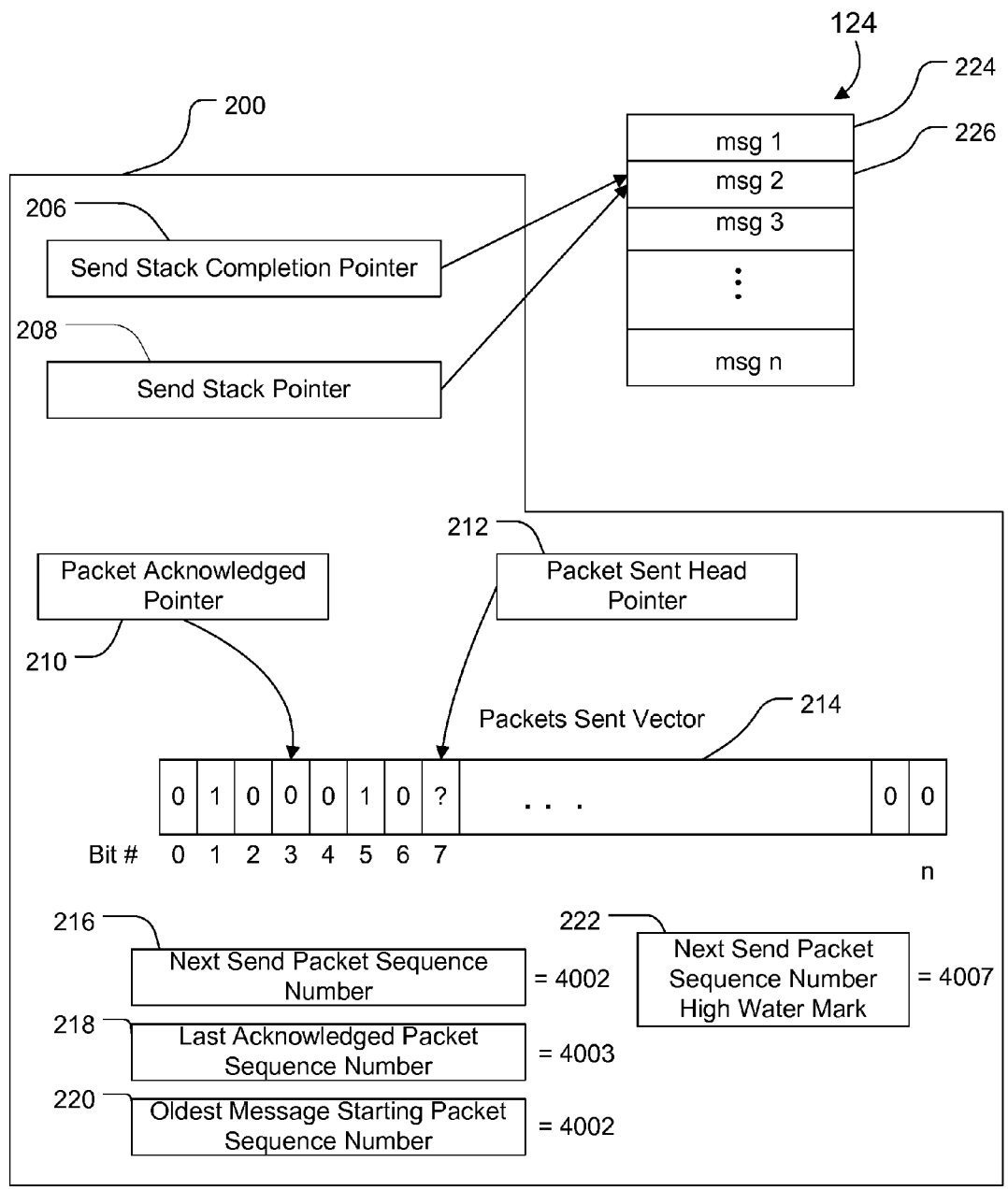
FIG. 5 is a block diagram of the I/O processor shown in FIG. 1 after a timeout error.

FIG. 5 shows the state of the I/O interface after a timeout, indicating an acknowledge was not received in an allotted amount of time. The interface must now retransmit packets beginning with the oldest non-acknowledged packet. The retransmission is accomplished by moving the Send Stack Pointer 208 back to the same location as the Send Stack Completion Pointer 206. The Send Stack Completion Pointer 206 is pointing to the last unacknowledged message on the message stack 124. This message 226, msg2, is re-fetched from the message stack 124 in main memory since some portion of this message was never acknowledged. This message's first packet's sequence number, currently 4002, is held in the Oldest Message Starting Packet Sequence Number 220, therefore this value is copied into the Next Send Packet Sequence Number 216. Since packets up to and including sequence number 4003 have already been acknowledged, as indicated by PAP 210, the I/O processor 200 can skip the actual transmission of the first two packets of this message (4002 and 4003) by incrementing the Next Send Packet Sequence Number 216 to 4004, and begin transmitting the remainder of the message. The Next Send Packet Sequence Number High Water Mark still holds 4007.

Figure 6:
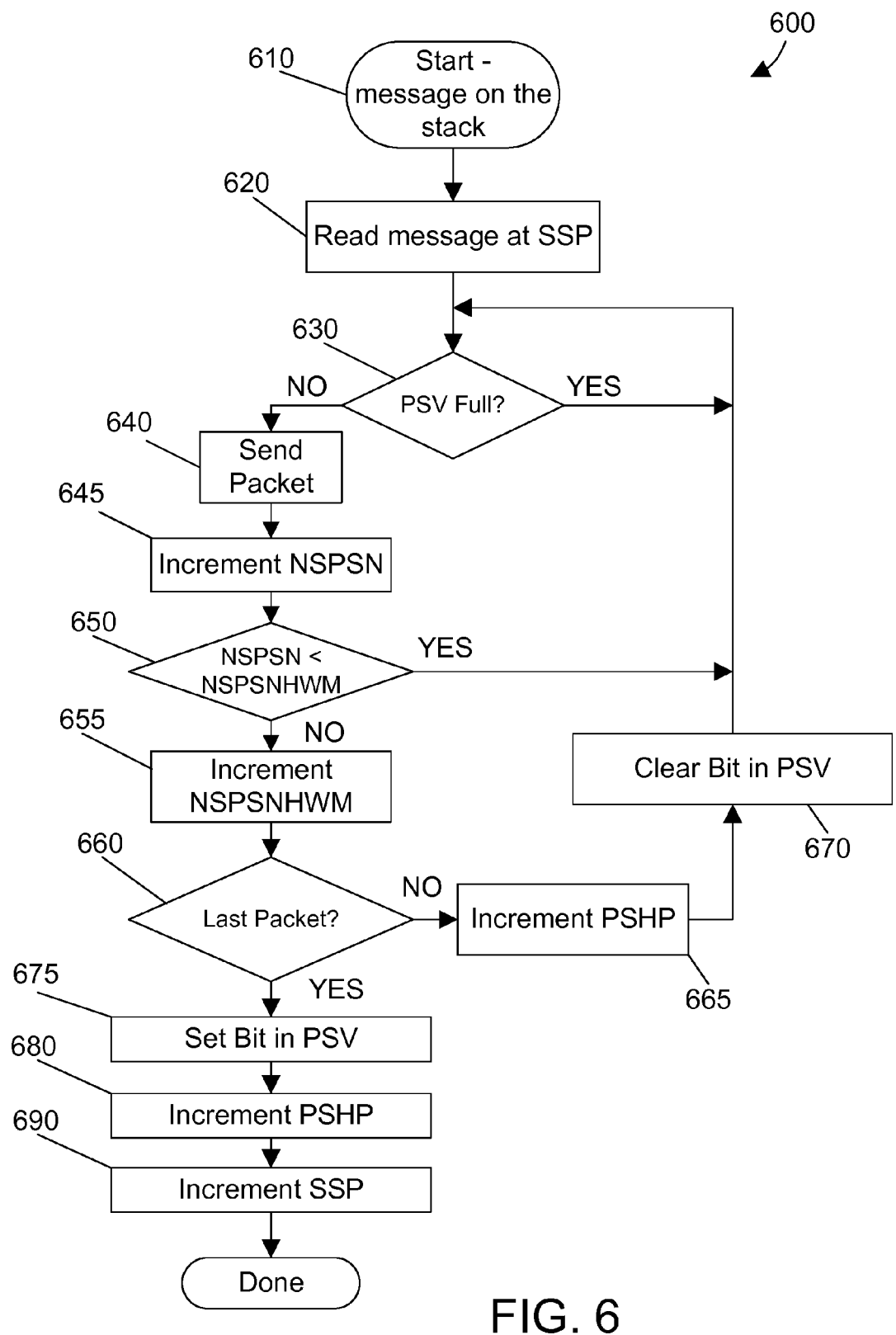
FIG. 6 is a flow diagram a method for sending packets in accordance with a preferred embodiment.

Referring now to FIG. 6, a method 600 for sending packets in a reliably connected transmission system in accordance with a preferred embodiments is shown. Method 600 begins when there are messages in the message stack to be sent (step 610). Method 600 will read the first message on the message stack pointed to by the Send Stack Pointer (step 620).

If the PSV is not full (step 630=no), a packet is sent (step 640). After each packet of the message is sent (step 640), the method 600 increments the NSPSN (step 645). Method 600 then checks if the NSPSN is less than the NSPSNHWM (step 650). If step 650=yes, then the method returns to step 630 for the next packet. This is done because the packet just sent was a resend. If step 650=no, then the packet was not a resend and the NSPSNHWM needs to be incremented (step 655). Method 600 then checks to see if the packet is the last packet in the message (step 660). If the packet is not the last packet (step 660=no), the Packet Sent Head Pointer is advanced by one (step 665), the bit in the Packets Sent Vector 214 pointed to by the PSP is cleared (set to a zero) (step 670) and the method 600 returns to step 630. If the packet is the last packet of the message (step 660=yes), the bit in the Packets Sent Vector pointed to by the PSP is set to a one (step 675), indicating this packet is the last packet of the message, and the PSHP is then advanced to the next bit in the Packets Sent Vector (step 680). Since the sending of all packets of the message is complete at this point, the method will also advance the Send Stack Pointer SSP (step 690).

Figure 7:
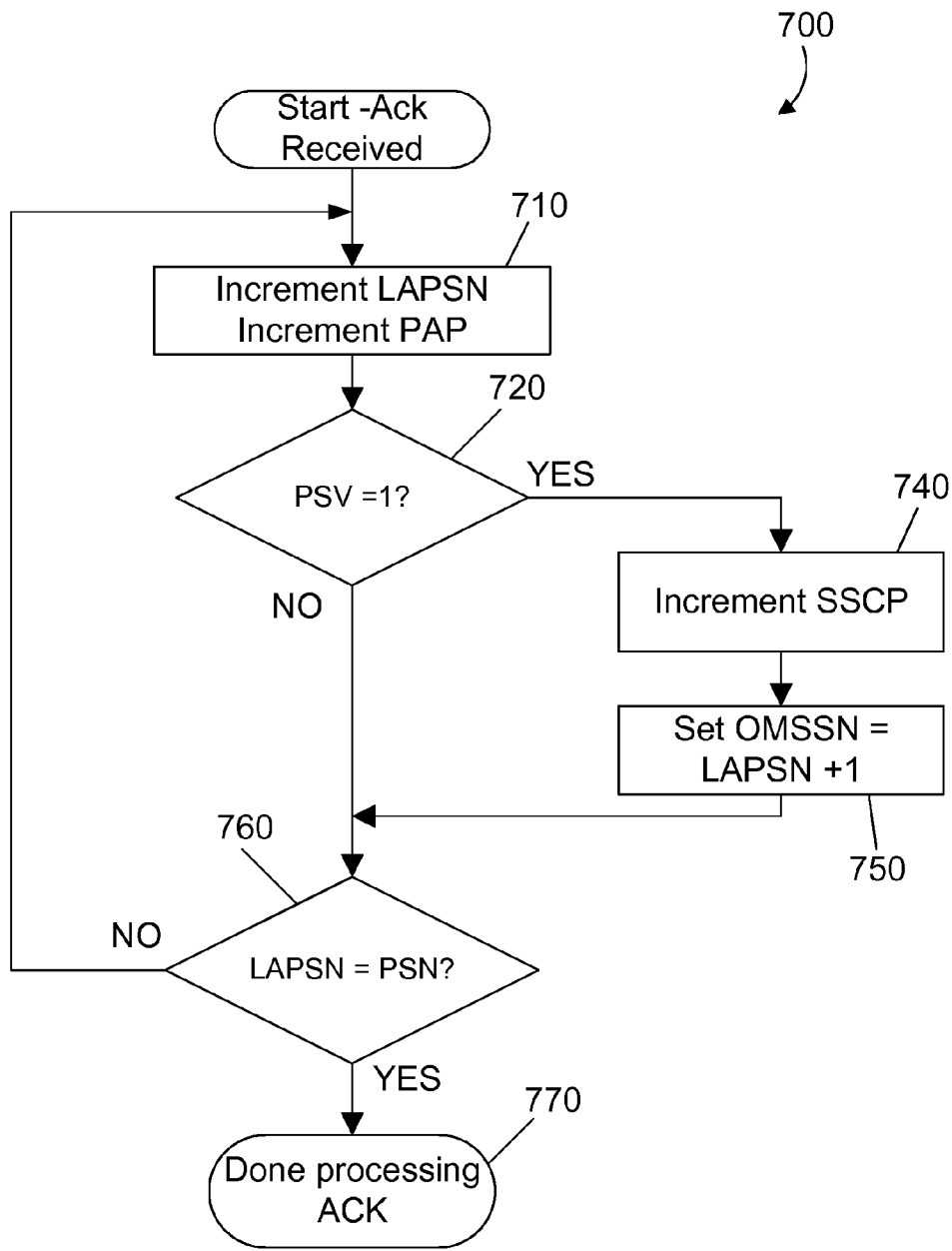
FIG. 7 is a flow diagram of a method for processing an acknowledge message in accordance with a preferred embodiment.

When an acknowledge message is received, method 700 in FIG. 7 is performed. Method 700 uses the information in the acknowledge message to determine which packets have been received, and marks the progress of the received messages. First, the LAPSN and the PAP are incremented (step 710). Method 700 then checks the value of the bit in the PSV pointed to by the PAP (step 720). If the bit is a one (step 720=yes), then the last packet of a message was received and acknowledged, and so the message is complete. When a one bit is found in the PSV, the SSCP can be advanced (step 740) as there is now no longer a reason to retransmit this message; it has reliably been transferred. The method will also update the sequence number held in the OMSSN to the LAPSN+1 (step 750). Method 700 then compares the packet sequence number (PSN) in the acknowledge to the LAPSN (step 760).

If the PSN does not equals the LAPSN (step 760=no) then the PAP is not done being incremented and the processing of the acknowledge continues by returning to step 710. If the PSN equals the LAPSN (step 760=yes) then the PAP is done being incremented and the processing of the acknowledge is complete.

Figure 8:
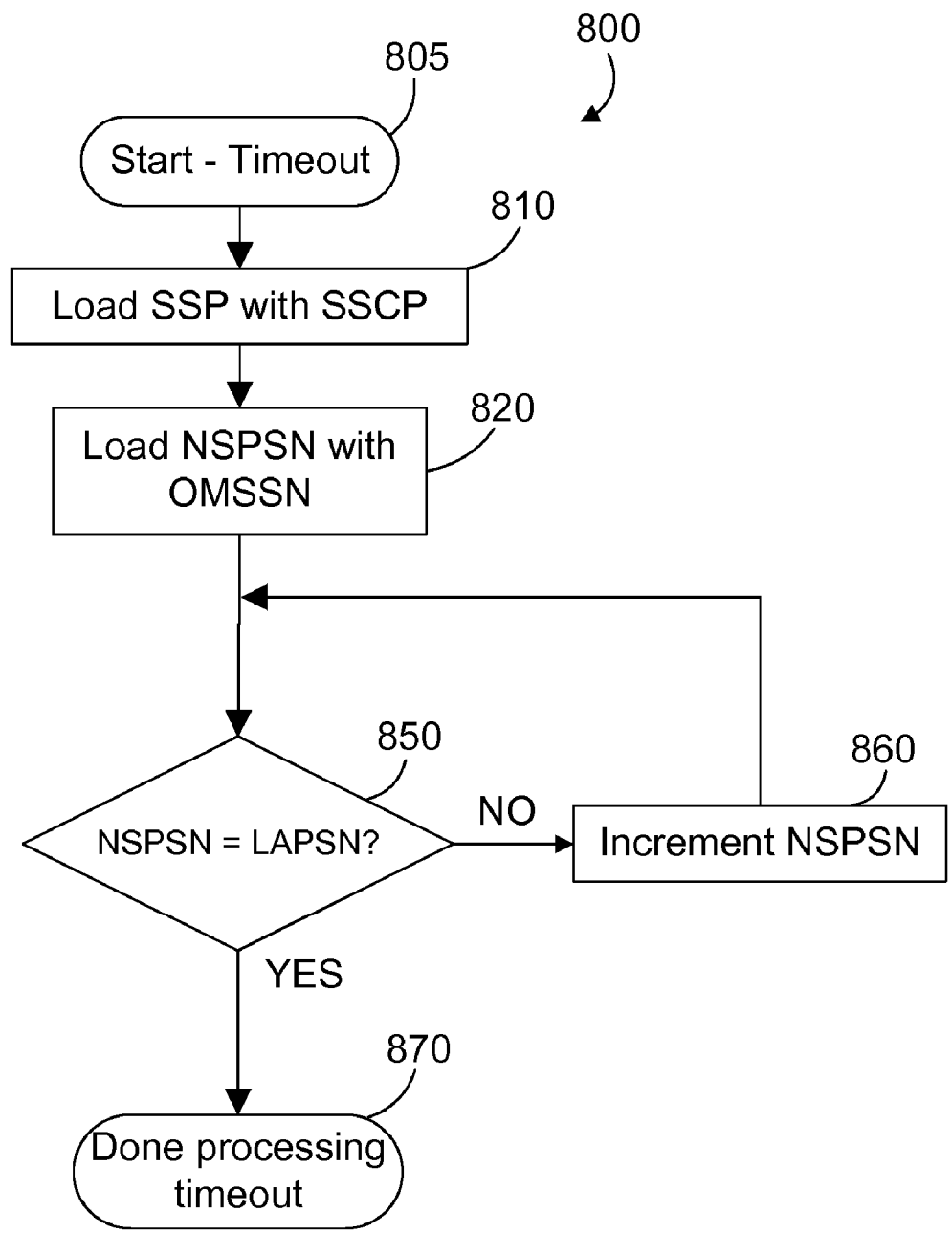
FIG. 8 is a flow diagram of a method for processing a timeout in accordance with a preferred embodiment.

When an error occurs, method 800 shown in FIG. 8 is performed. If a packet is lost indicated by the receiving computer not sending back an acknowledge, or the acknowledge itself is lost, a time out condition is detected (step 805). The method 800 will take the item pointed to by the Send Stack Completion Pointer and use it as the next item to send by loading its value to the SSP (step 810). Since the SSCP is only advanced when messages are completed, it points to the first item in the stack that has not received all of its acknowledge messages and therefore is the first message that needs to be resent. Since the retried packet needs to have the same packet sequence number of the original packet, it is necessary to determine the starting PSN of the message. This is done by reloading the NSPSN from the OMSSN (step 820). Method 800 then updates the Next Send Packet Sequence Number to skip resending packets of this message that were already successfully sent. This is done by comparing the NSPSN to the LAPSN (step 850), and increments the NSPSN (step 860) until they are equal (step 850=yes). If the NSPSN is equal to the LAPSN (step 850=yes) then method 800 is done adjusting the pointers. The packets not received will be resent when method 600 continues sending messages with the adjusted pointers.

The present invention as described with reference to the preferred embodiments herein provides significant improvements over the prior art. The amount of memory needed in the transmission interface for tracking packets and reliably transmitting data over a computer transmission system is significantly reduced. This allows a much greater number of packets to be in flight without a correspondingly large queue for systems with a large packet size, high speed, and long transmission times.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

We claim:

1. An apparatus comprising:
at least one processor;
a memory coupled to the at least one processor that stores a plurality of messages comprising data packets to be sent to a remote computer system; and
an I/O processor that sends the data packets to the remote computer system using pointers to read the data packets from the memory, and wherein the I/O processor resends a lost data packet to the remote computer when an acknowledge message for the lost data packet is not received from the remote computer by re-reading the data from the memory.

2. The apparatus of claim 1 wherein the I/O processor further comprises a Packets Sent Vector which has an indicator corresponding to each packet, and wherein the indicator indicates whether the corresponding packet lies on a message boundary.

3. The apparatus of claim 2 wherein the Packets Sent Vector has a single bit for each packet which is set to indicate the corresponding packet is the last packet of a message.

4. The apparatus of claim 2 wherein the Packets Sent Vector is a 1 bit wide hardware register.

5. The apparatus of claim 2 further comprising pointers to the Packets Sent Vector which comprise a Packet Sent Head Pointer and a Packet Acknowledge Pointer.

6. The apparatus of claim 1 wherein the pointers comprise a Send Stack Pointer and a Send Stack Completion pointer.

7. The apparatus of claim 1 wherein the I/O processor further comprises sequence number registers which include a Last Acknowledged Packet Sequence Number, a Next Send Packet Sequence Number and a Next Send Packet Sequence Number High Water Mark.

8. The apparatus of claim 7 wherein the I/O processor further comprises an Oldest Message Starting Sequence Number register for reloading the Next Send Packet Sequence Number when resending packets that were not acknowledged.

9. The apparatus of claim 1 wherein the I/O interface is contained in a network interface for sending the data packets over a network.

10. An apparatus comprising:
at least one processor;
a memory coupled to the at least one processor that stores a plurality of messages comprising a plurality of data packets to be sent to another computer system;
a network interface for transmitting the data packets comprising:
pointers to the messages in the memory; and
a Packets Sent Vector that contains an indicator corresponding to each packet sent and not yet acknowledged and wherein the indicator indicates whether the corresponding packet lies on a message boundary.

11. The apparatus of claim 10 wherein the Packets Sent Vector has a single bit for each packet which is set to indicate the corresponding packet is the last packet of a message.

12. The apparatus of claim 10 wherein the Packets Sent Vector is a 1 bit wide hardware register in the network interface.

13. The apparatus of claim 10 wherein the pointers to the messages in memory further comprise a Send Stack Pointer and a Send Stack Completion pointer.

14. The apparatus of claim 10 further comprising pointers to the Packets Sent Vector which comprise a Packet Sent Head Pointer and a Packet Acknowledge Pointer.

15. The apparatus of claim 10 further comprising sequence number registers which comprise a Last Acknowledged Packet Sequence Number, a Next Send Packet Sequence Number, an Oldest Message Starting Sequence Number and a Next Send Packet Sequence Number High Water Mark.

16. An apparatus comprising:
at least one processor;
a memory coupled to the at least one processor that stores a plurality of messages comprising a plurality of data packets to be sent to another computer system;
an interface for transmitting the data packets comprising:
a Send Stack Pointer and a Send Stack Completion pointer that point to the messages in the memory;
a Packets Sent Vector that has a single bit for each packet which is set to indicate the corresponding packet is the last packet of a message; and
a Packet Sent Head Pointer and a Packet Acknowledge Pointer that point to corresponding bits in the Packets Sent Vector.

* * * * *